Patented July 7, 1936

2,046,907

UNITED STATES PATENT OFFICE 2,046,907

TREATMENT OF HYDROCARBON OILS

Felix John Skowronski, Chicago, Ill., assignor, by mesne assignments, to Universal Oil Products Company, Chicago, Ill., a corporation of Delaware No Drawing. Application May 2, 1931,
Serial No. 534,693

4 Claims. (Cl. 196—36)

This invention relates to the treatment of hydrocarbon oils, and refers more particularly to the treatment of petroleum distillates, especially those resulting from the cracking or conversion of higher boiling hydrocarbons into lighter and more valuable lower boiling hydrocarbons.

Petroleum distillates, especially those produced from a cracking operation, contain gum and color-forming components usually of a highly unsaturated character, which render the product thereof unmarketable, or which are relatively expensive to refine into a marketable product. It is among the objects of my invention to refine these petroleum distillates in order to economically produce a product which possesses good color and stability, and from which substantially all of the objectionable gum-forming components have been removed.

It is a further object of my invention to remove the odoriferous components of the petroleum distillates, such as certain sulfur compounds, particularly the mercaptans and hydrogen sulfide in order that a sweet distillate may be produced.

In a specific embodiment, the invention comprises treating petroleum distillates, particularly cracked distillates, by treating said distillates with copper silicate. Preferably, the treatment of said distillates is carried out while the distillates are in a vaporous state.

In another embodiment of the invention, the petroleum distillates, preferably in vaporous form are brought in contact with and subjected to the action of copper silicate while in the presence of hydrochloric acid or hydrogen chloride and steam.

The contacting or treating agent which I employ,—copper silicate, may be prepared according to the following example:—

A diluted solution of sodium meta-silicate, for example, when a concentration of approximately 0.25% is added to a solution of cupric sulfate of approximately 2% concentration, precipitates cupric silicate as a gelatinous mass. The precipitate is washed, preferably with boiling water and is slowly dried. The resulting product is a solid gel-like substance, and, it is believed, is of a highly porous character. The above description of precipitation is given, mainly for the purpose of pointing out a successful method of preparation, since the hydroxid-ion concentration of sodium silicate is such that cupric hydroxide will be precipitated with certain concentrations of the reagents, and it is preferred that this be avoided to as great an extent as possible.

In the practice of my invention, any desired method of treating the distillate may be adopted, and any desired apparatus or means may be employed which will permit of an efficient contacting of the hydrocarbons under treatment with a copper silicate. In one application of the process, the copper silicate may be disposed within a suitable treating tower or column which may be connected directly to a cracking process or with a conventional still wherein vapors are evolved, and the vapors or distillate to be subjected to treatment may be introduced into said tower or treating column for passage through the copper silicate. In one method of operation, the vapors may be passed upwardly through the tower wherein the copper silicate is disposed, and after passage through the contact mass of copper silicate, the objectionable gum and color-forming components will polymerize, be settled out in the bottom of the tower and withdrawn, while the desired, refined overhead product may be passed from said tower to suitable condensing and recovery apparatus of the usual type. In another method of treatment, the vapors may be passed downwardly through the tower and copper silicate contained therein, after which the treated product is condensed and redistilled.

In the practice of the invention wherein hydrochloric acid or steam and hydrogen chloride are employed in conjunction with the treating agent of my invention, the hydrochloric acid may be first vaporized and then passed into the treating tower together with the vaporous products for contact and treatment therein with the copper silicate; or, if desired, steam and hydrogen chloride may be introduced into the treating tower together with the hydrocarbon vapors. In general, any method may be employed whereby the simultaneous treatment of the vapors, hydrochloric acid and/or steam and hydrogen chloride and copper silicate is effected.

It is obvious from the foregoing that by the employment of the process of my invention, direct treatment of the vapors from a cracking process may be effected, thereby providing a method to be preferred from an economic viewpoint, since it eliminates the redistillation operation.

As examples of the results obtained in the practice of the process of my invention, the following are illustrative:—

A California cracked distillate was vaporized and the vapors passed through a treating column wherein a contact mass of copper silicate, prepared as previously described, was maintained. After passage through the treating column and copper silicate, the treated distillate possessed a good, stable color, was low in gum content and was of satisfactory odor. An untreated distillate, similarly distilled, but without being subjected to the action of the treating agent of my invention, was yellow in color, had a high gum content and possessed an objectionable odor.

The treatment of a Mid-Continent cracked distillate in accordance with my process, produced a product of plus 25 color, 30 mgs. of gum per 100 c. c. by the copper dish method, and was of satisfactory odor, and the treated products were sweet to the doctor test.

Similar results may be obtained in the treatment of cracked distillates from various sources, such as those from Venezuela, West Texas and Pennsylvania, the results varying in degree as the function of the raw materials treated and the conditions of treatment.

I have also found that the copper silicate reagent employed in my invention is also useful as a sweetening agent for petroleum distillates. When it is desired to effect this sweetening action, the distillate under treatment may be simply filtered through a column of the copper silicate.

I claim as my invention:—

1. A process for the treatment of hydrocarbon oil which comprises subjecting said oil to the action of copper silicate in the presence of hydrochloric acid.

2. A process for the treatment of hydrocarbon oil which comprises subjecting said oil to the action of copper silicate in the presence of steam and hydrogen chloride.

3. A process for the treatment of hydrocarbon oil which comprises contacting hydrocarbon vapors with copper silicate in the presence of hydrochloric acid.

4. A process for the treatment of hydrocarbon oil which comprises passing said oil while in vaporous form through a contact mass of copper silicate in the presence of steam and hydrogen chloride.

FELIX JOHN SKOWRONSKI.